United States Patent
Liang

(10) Patent No.: US 10,455,152 B2
(45) Date of Patent: Oct. 22, 2019

(54) PANORAMIC VIDEO PROCESSING METHOD AND DEVICE AND NON-TRANSITORY COMPUTER-READABLE MEDIUM

(71) Applicant: Lingyan Liang, Beijing (CN)

(72) Inventor: Lingyan Liang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/955,858

(22) Filed: Apr. 18, 2018

(65) Prior Publication Data
US 2018/0359415 A1   Dec. 13, 2018

(30) Foreign Application Priority Data
Jun. 9, 2017   (CN) .......................... 2017 1 0432784

(51) Int. Cl.
| | | |
|---|---|---|
| G06T 5/00 | (2006.01) | |
| H04N 5/357 | (2011.01) | |
| G06T 7/246 | (2017.01) | |
| H04N 5/232 | (2006.01) | |

(52) U.S. Cl.
CPC ..... *H04N 5/23238* (2013.01); *H04N 5/23264* (2013.01); *H04N 5/357* (2013.01)

(58) Field of Classification Search
None
See application file for complete search history.

(56) References Cited

U.S. PATENT DOCUMENTS

2006/0023786 A1*  2/2006  Li ..................... G06T 3/0087
                                                    375/240.16
2006/0062296 A1*  3/2006  Li ..................... G06T 3/4038
                                                    375/240.12
2006/0072663 A1*  4/2006  Li ..................... H04N 19/513
                                                    375/240.16

(Continued)

OTHER PUBLICATIONS

Kopf, "360° Video Stabilization," ACM Trans. on Graphics, vol. 35, No. 6, Nov. 11, 2016, pp. 1-9. (Year: 2016).*

(Continued)

*Primary Examiner* — Reza Aghevli
(74) *Attorney, Agent, or Firm* — IPUSA, PLLC

(57) ABSTRACT

Panoramic video processing method and device are disclosed. The method includes steps of receiving a panoramic video waiting for processing; conducting inter frame motion estimation in regard to any two neighboring 2D panoramic images in the panoramic video so as to obtain an inter frame motion estimation result between the same two neighboring 2D panoramic images; acquiring, based on the respective inter frame motion estimation results, a historical motion trajectory of the panoramic video, and carrying out smoothing with respect to the historical motion trajectory; calculating, based on the historical motion trajectory after smoothing, a rotation matrix for motion compensation pertaining to each 2D panoramic image in the panoramic video; and performing reconstruction on each 2D panoramic image in the panoramic video by means of the corresponding rotation matrix for motion compensation so as to attain a panoramic video after image stabilization, and outputting the panoramic video after image stabilization.

6 Claims, 11 Drawing Sheets

(56) References Cited

U.S. PATENT DOCUMENTS

2015/0029306 A1 1/2015 Cho et al.
2017/0244948 A1* 8/2017 Pang .................... H04N 5/2226

OTHER PUBLICATIONS

Zhu, et al., "Fast construction of dynamic and multi-resolution 360° panoramas from video sequences," Image and Vision Computing, vol. 24, 2006, pp. 13-26. (Year: 2006).*

Rawat et al., "Review of Motion Estimation and Video Stabilization Techniques for Hand-held Mobile Video," Signal and Image Processing: An International Journal (SIPIJ), vol. 2, No. 2, Jun. 2011, pp. 159-168. (Year: 2011).*

Arsalan et al., "Panoramic Video Stabilization Based on Rotational Damping Filter," Proc. of 2016 13th International Bhurban Conf. on Applied Sciences and Technology (IBCAST), Jan. 12-16, 2016, pp. 286-290. (Year: 2016).*

Sawhney et al., "Model-based 2D&3D Dominant Motion Estimation for Mosaicing and Video Representation," Proc. of IEEE International Conf. on Computer Vision, Jun. 20-23, 1995, pp. 583-590. (Year: 1995).*

Johannes Kopf: "360° video stabilization", ACM Transactions on Graphics (TOG), ACM, US, vol. 35, No. 6, Nov. 11, 2016 (Nov. 11, 2016), pp. 1-9, XP058306369, ISSN: 0730-0301, DOI: 101145/2980179.2982405.

Arsalan Aamir et al: "Panoramic video stabilization based on rotational damping filter", 2016 13th International Bhurban Conference on Applied Sciences and Technology (IBCAST), IEEE, Jan. 12, 2016 (Jan. 12, 2016), pp. 286-290, XP032878805, DOI: 10.1109/IBCAST.2016.7429891 ISBN: 978-1-4673-9126-9.

Shuaicheng Liu et al: "Bundled camera paths for video stabilization", ACM Transactions on Graphics (TOG), vol. 32, Jul. 11, 2013 (Jul. 11, 2013), p. 1, XP055283112, US ISSN : 0730-0301, DOI :10.1145/2461912.2461995.

Extended European Search Report for 18168834.2 dated Sep. 27, 2018.

* cited by examiner

PANORAMIC VIDEO PROCESSING METHOD AND DEVICE AND NON-TRANSITORY COMPUTER-READABLE MEDIUM

BACKGROUND OF THE DISCLOSURE

1. Field of the Disclosure

The present disclosure relates to the field of mobile video processing, and more particularly relates to a panoramic video processing method and device as well as a non-transitory computer-readable medium.

2. Description of the Related Art

With the rapid development of photography apparatuses and mobile networks, hand-held camera based video capture has been widely applied in people's lives, for example, mobile live video platforms, live travel, and live shopping. In order to provide good quality videos for users, video stabilization plays a very important role in real time video processing.

At present, there are mainly three approaches able to achieve video stabilization, namely, mechanical processing, optical processing, and digital processing. The mechanical processing based approach is using an additional sensor such as a gyroscope, an angle sensor, or the like to acquire motion information of a camera for carrying out motion compensation. The optical processing based approach is utilizing an optical apparatus to adjust the direction and distance between a lens and a prism so as to remove the shaking of a camera, for instance. These two kinds of approaches are both on the grounds of additional hardware, so it is usually necessary to adopt expensive devices, and their portability is not good. The approach based on digital processing is obtaining shaking related motion information by way of image processing, and then, attaining a stabilized image sequence (i.e., a video) by means of image compensation without employing any additional mechanical or optical device. As such, compared to the approaches based on mechanical and optical processing, the digital processing based approach is of wide application.

In addition, on the basis of whether to gain a stable video in real time, the video stabilization approach based on digital processing may be divided into on-line video stabilization and off-line video stabilization. Because the off-line video stabilization approach is a type of video post-processing, the motion trajectory of the whole image sequence may be procured. Thus, it is possible to estimate an optimum smooth path (locus) so as to acquire a more robust and stable video stream. On the contrary, the on-line video stabilization approach cannot take advantage of motion information in the future, so its robustness is not good compared to the off-line video stabilization approach; however, timeliness may be guaranteed. Regardless of the on-line or off-line video stabilization approach, the digital processing based video stabilization approach mainly includes three steps, namely, motion estimation, motion smoothing, and motion compensation. The motion estimation is estimating the initial motion trajectory of a camera. The motion smoothing is calculating a smooth motion trajectory according to the initial motion trajectory. And the motion compensation refers to conducting motion compensation in regard to the initial video on the basis of the smooth motion trajectory so as to gain a stabilized image sequence.

In general, a conventional video stabilization approach adopts a two dimensional (2D) affine transformation model so as to conduct motion estimation based on a rotation matrix and offset matrix, and then, carries out motion compensation along X and Y axes, respectively. As the manufacturing technologies of cameras are developed, 360-degree panoramic cameras are becoming more and more popular. So far, they have been applied to many fields like video surveillance, live streaming, etc. In order to provide better panoramic video quality, panoramic video stabilization techniques are getting people's attention. However, in panoramic video stabilization, due to the particularity of spherical images, motion estimation cannot be conducted by using a conventional 2D motion model. That is, it is impossible to perform video stabilization on a panoramic video in conventional techniques.

SUMMARY OF THE DISCLOSURE

In light of the above, the present disclosure provides a panoramic video processing method and device by which it is possible to conduct video stabilization in regard to a panoramic video.

According to a first aspect of the present disclosure, a panoramic video processing method is provided which includes steps of receiving a panoramic video waiting for processing, the panoramic video containing a plurality of two dimensional (2D) panoramic images; conducting inter frame motion estimation in regard to any two neighboring 2D panoramic images in the panoramic video so as to obtain an inter frame motion estimation result between the same two neighboring 2D panoramic images; acquiring, based on the respective inter frame motion estimation results, a historical motion trajectory of the panoramic video, and carrying out smoothing with respect to the historical motion trajectory; calculating, based on the historical motion trajectory after smoothing, a rotation matrix for motion compensation pertaining to each 2D panoramic image in the panoramic video; and performing reconstruction on each 2D panoramic image in the panoramic video by means of the corresponding rotation matrix for motion compensation so as to attain a panoramic video after image stabilization, and outputting the panoramic video after image stabilization.

According to a second aspect of the present disclosure, a panoramic video processing device is provided which is inclusive of a receipt part configured to receive a panoramic video waiting for processing, the panoramic video including a plurality of two dimensional (2D) panoramic images; an estimation part configured to conduct inter frame motion estimation in regard to any two neighboring 2D panoramic images in the panoramic video so as to obtain an inter frame motion estimation result between the same two neighboring 2D panoramic images; a first calculation part configured to calculate, based on the respective inter frame motion estimation results, a historical motion trajectory of the panoramic video, and carrying out smoothing with respect to the historical motion trajectory; a second calculation part configured to compute, based on the historical motion trajectory after smoothing, a rotation matrix for motion compensation pertaining to each 2D panoramic image in the panoramic video; and a reconstruction part configured to perform reconstruction on each 2D panoramic image in the panoramic video by means of the corresponding rotation matrix for motion compensation so as to attain a panoramic video after image stabilization, and outputting the panoramic video after image stabilization.

According to a third aspect of the present disclosure, an electronic apparatus for achieving panoramic video processing is provided which is inclusive of a processor(s) and a storage connected to the processor. The storage stores computer-executable instructions that, when executed, make the processor to implement the panoramic video processing method depicted above.

According to a fourth aspect of the present disclosure, a computer-executable program and a non-transitory computer-readable medium are provided. The computer-executable program causes a computer to conduct the panoramic video processing method described above. The non-transitory computer-readable medium stores computer-executable instructions (i.e., the computer-executable program) for execution by a computer involving a processor(s) or processing system. The computer-executable instructions, when executed, render the processor(s) or processing system to carry out the panoramic video processing method set forth above.

As a result, it is obvious from the above that by calculating a rotation matrix for motion compensation relating to each 2D panoramic image (frame) in a panoramic video, and utilizing the rotation matrix for motion compensation so as to carry out reconstruction with respect to each 2D panoramic image in the panoramic video, it is possible to achieve video stabilization of the panoramic video.

DETAILED DESCRIPTION OF THE PREFERRED EMBODIMENTS

In order to let a person skilled in the art better understand the present disclosure, hereinafter, the embodiments of the present disclosure will be concretely described with reference to the drawings. However, it should be noted that the same symbols, which are in the specification and the drawings, stand for constructional elements having basically the same function and structure, and the repetition of the explanations to the constructional elements is omitted.

<First Embodiment>

A panoramic video processing method is given in this embodiment.

Figure 1:
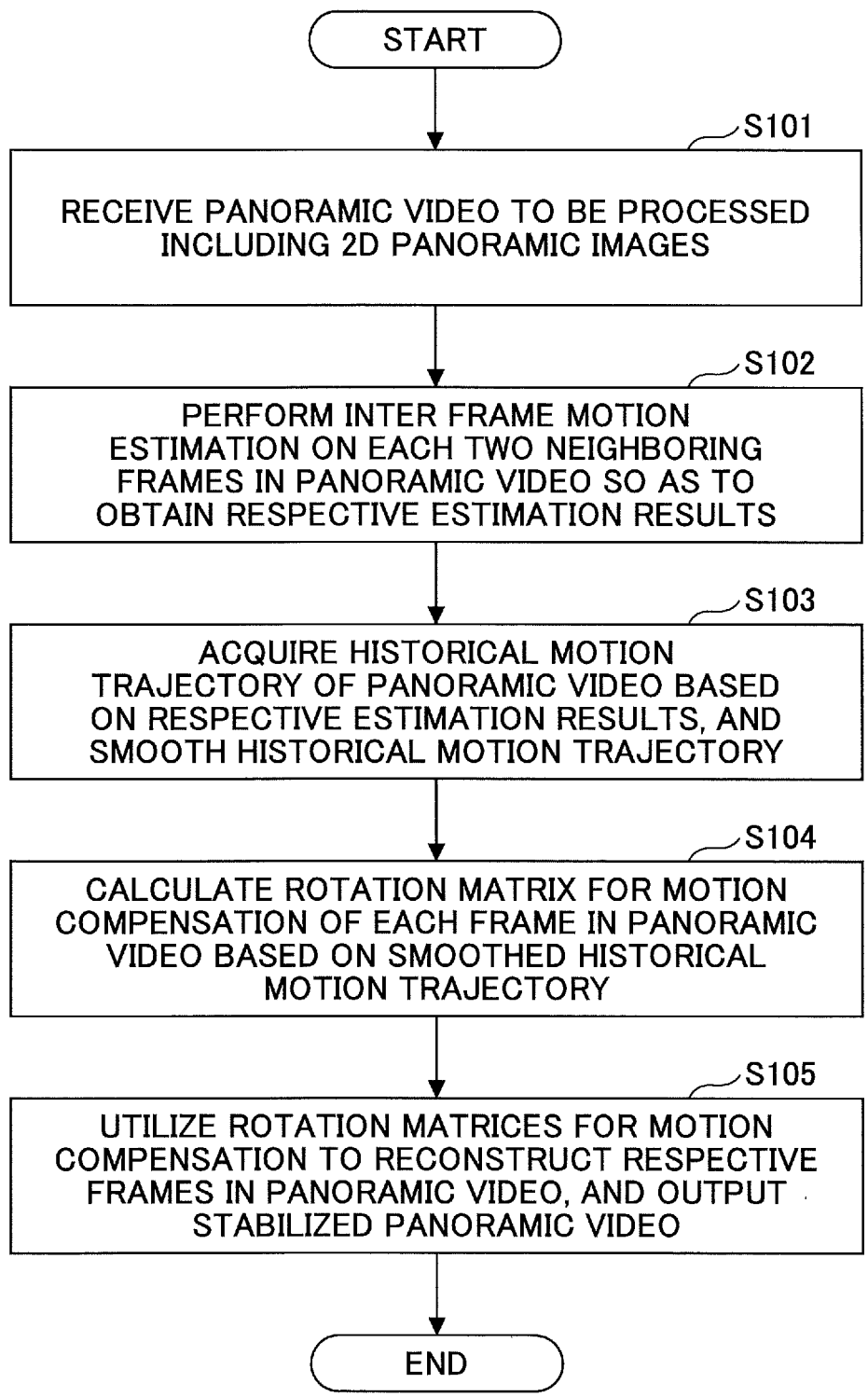
FIG. 1 is a flowchart of a panoramic video processing method in accordance with a first embodiment of the present disclosure.

FIG. 1 is a flowchart of a panoramic video processing method according to this embodiment.

As presented in FIG. 1, the panoramic video processing method contains STEPS S101 to S105.

In STEP S101, a panoramic video to be processed is received which includes a plurality of two dimensional (2D) panoramic images (frames).

In STEP S102, inter frame motion estimation is conducted in regard to any two adjacent 2D panoramic images (i.e., each two neighboring frames) in the panoramic video, so as to obtain an inter frame motion estimation result between the same two adjacent 2D panoramic images.

In STEP S103, on the basis of the respective inter frame motion estimation results, a historical motion trajectory of the panoramic video is acquired, and a smoothing process is performed on the historical motion trajectory.

In STEP S104, a rotation matrix for motion compensation of each 2D panoramic image in the panoramic video is calculated on the grounds of the historical motion trajectory after smoothing.

In STEP S105, a reconstruction process is carried out with respect to each 2D panoramic image in the panoramic video by using the corresponding rotation matrix for motion compensation so as to attain a panoramic video after video stabilization, and the panoramic video after video stabilization is output.

In general, because the spherical panoramic image corresponding to a 2D panoramic image may rotate in any direction without entailing image information loss, there must be a rotation vector between two 2D panoramic images that causes one of the two 2D panoramic images to approach the other. As such, the technical proposal in the present disclosure is calculating a rotation matrix for motion compensation pertaining to each 2D panoramic image in a panoramic video, and performing a reconstruction process on each 2D panoramic image therein by means of the corresponding rotation matrix for motion compensation, so as to fulfil video stabilization of the panoramic video.

Figure 2:
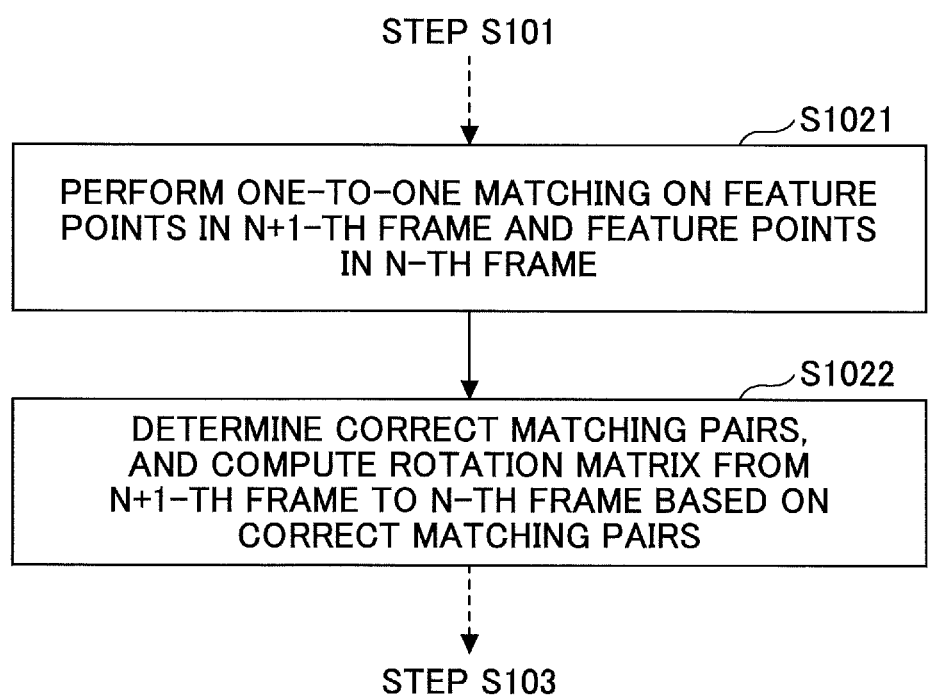
FIG. 2 is a flowchart of an example of STEP S102 in FIG. 1.

As an example, STEP S102 in FIG. 1 may be inclusive of STEPS S1021 and S1022, as shown in FIG. 2 which is a flowchart of STEP S102 in FIG. 1.

In STEP S1021, a one-to-one matching process is carried out with respect to feature points in an N+1-th 2D panoramic image and feature points in the N-th 2D panoramic image so as to acquire matching pairs of feature points (also called "matching pairs" for short). Here, N is a positive integer.

In STEP S1022, correct matching pairs are determined from all the matching pairs between the two neighboring 2D panoramic images, and a rotation matrix from the N+1-th 2D panoramic image to the N-th 2D panoramic image is computed on the basis of the correct matching pairs.

Figure 3:
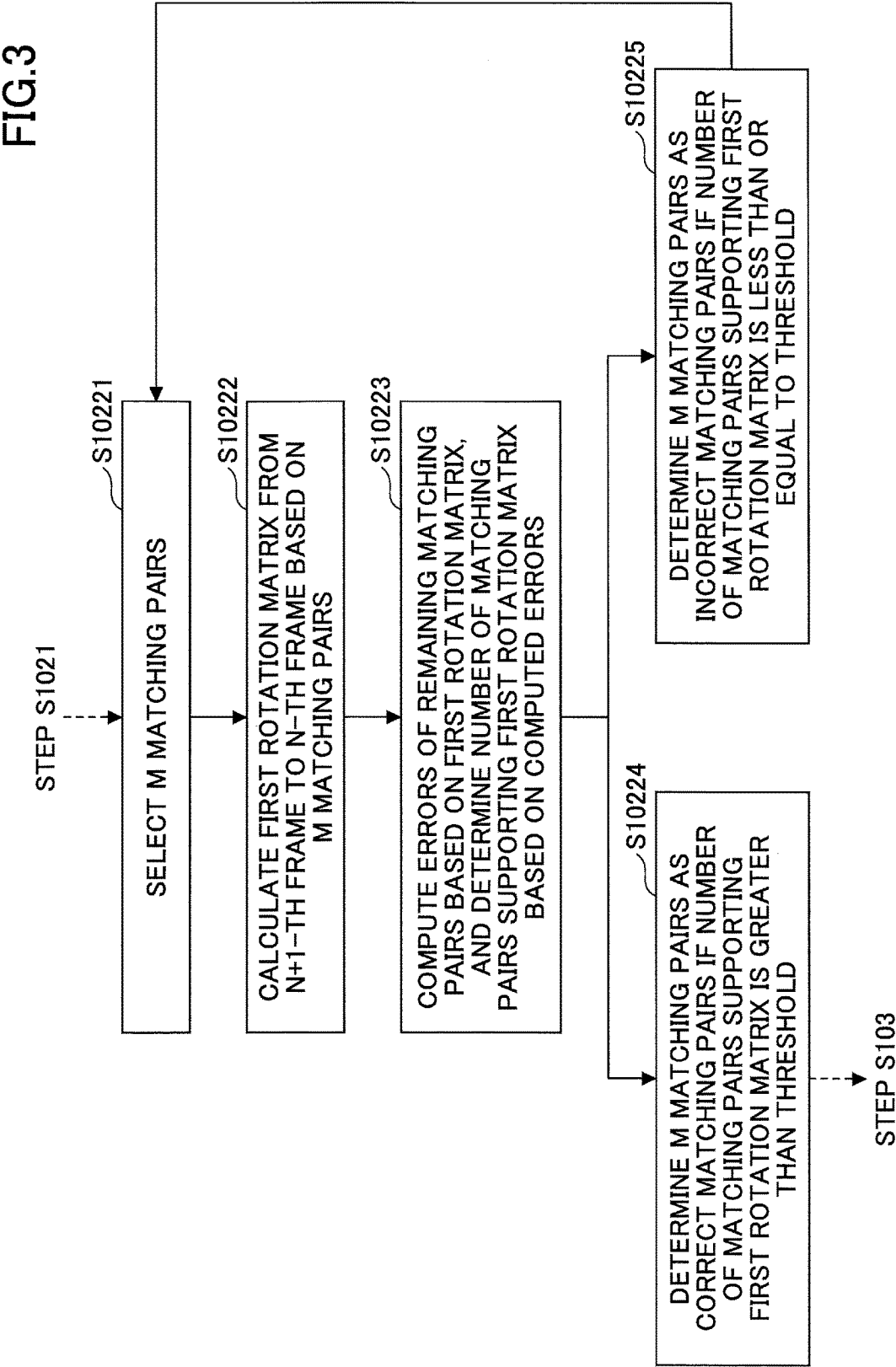
FIG. 3 is a flowchart of an illustration of STEP S1022 in FIG. 2.

As an illustration, STEP S1022 in FIG. 2 may include STEPS S10221 to S10225, as presented in FIG. 3 that is a flowchart of STEP S1022 in FIG. 2.

In STEP S10221, M matching pairs are selected from all the matching pairs between the two adjacent 2D panoramic images. Here, M is a positive integer greater than one.

In STEP S10222, on the grounds of the M matching pairs, a first rotation matrix from the N+1-th 2D panoramic image to the N-th 2D panoramic image is calculated.

In STEP S10223, errors of the other matching pairs (i.e. the remaining matching pairs) except the M matching pairs in all the matching pairs between the two neighboring 2D panoramic images are respectively calculated by way of the first rotation matrix, and the number of matching pairs supporting the first rotation matrix is determined on the basis of the calculated errors.

In STEP S10224, if the number of matching pairs supporting the first rotation matrix is greater than a predetermined threshold, then it is determined that the M matching pairs are correct matching pairs.

In STEP S10225, if the number of matching pairs supporting the first rotation matrix is less than or equal to the predetermined threshold, then it is determined that the M matching pairs are not correct matching pairs.

After that, the relevant process goes to STEP S10221, and chooses M new pairs of points again.

Figure 4:
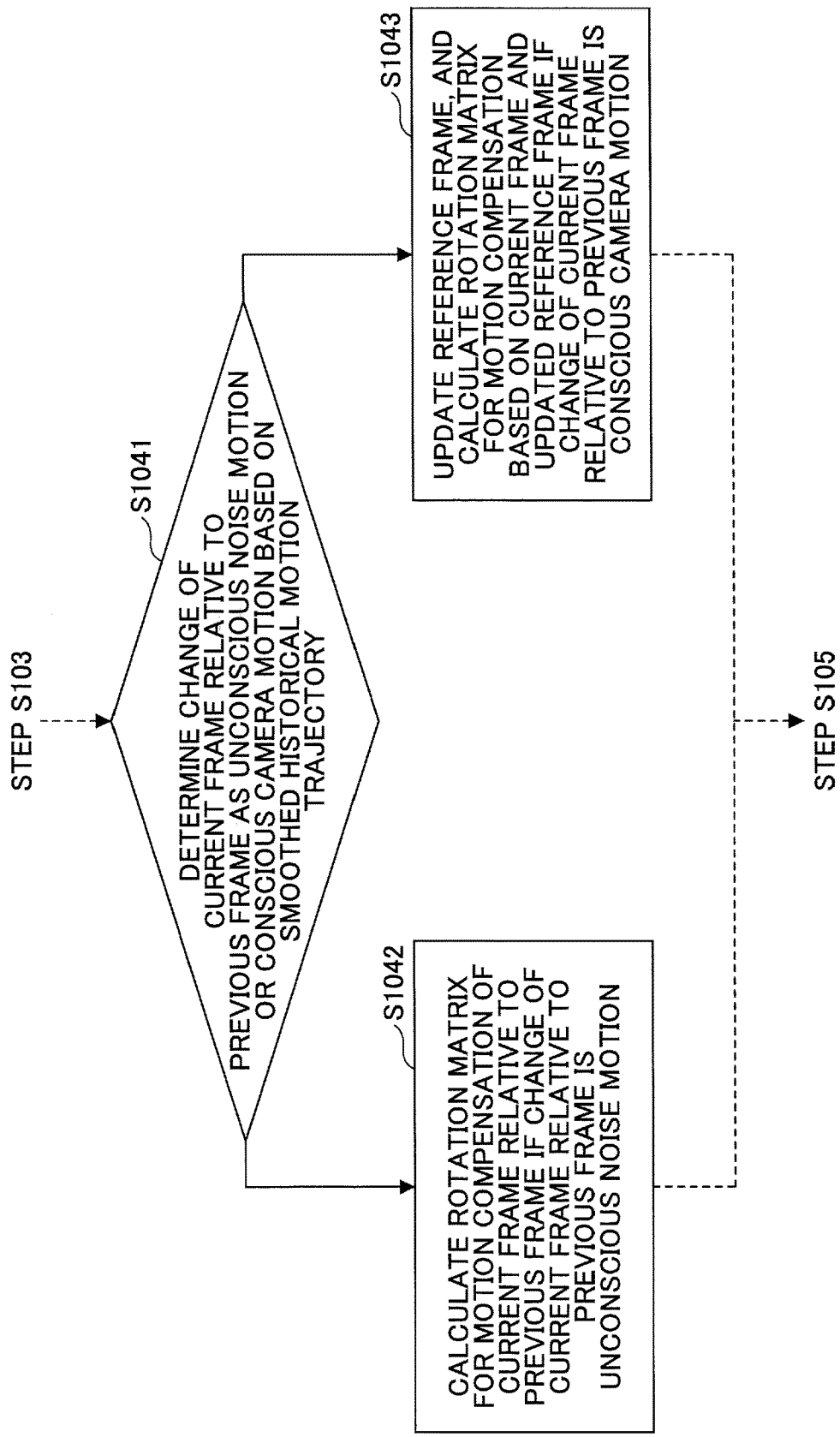
FIG. 4 is a flowchart of an example of STEP S104 in FIG. 1.

Additionally, as an example, STEP S104 in FIG. 1 may contain STEPS S1041 to S1043, as illustrated in FIG. 4 which is a flowchart of STEP S104 in FIG. 1.

In STEP S1041, on the basis of the historical motion trajectory after smoothing, it is determined that a change of a current 2D panoramic image (also called a "current frame" for short) relative to the previous 2D panoramic image (also called a "previous frame" for short) is unconscious noise motion or conscious camera motion.

In STEP S1042, if the change of the current 2D panoramic image relative to the previous 2D panoramic image is unconscious noise motion, then calculation is performed on the rotation matrix for motion compensation of the current 2D panoramic image relative to the previous 2D panoramic image.

In STEP S1043, if the change of the current 2D panoramic image relative to the previous 2D panoramic image is conscious camera motion, then the relevant reference 2D panoramic image (also called a "reference frame" for short) is updated, and a rotation matrix for motion compensation between the current 2D panoramic image and the updated reference 2D panoramic image is computed according to the two.

Here the relevant reference 2D panoramic image may be the first 2D panoramic image in the panoramic video generally. When it needs to be updated, it may be replaced by a later 2D panoramic image.

After that, in STEP S105 of FIG. 1, a smoothing process is conducted in regard to the rotation matrix for motion compensation pertaining to the current 2D panoramic image. And then, a motion compensation process is carried out with respect to the current 2D panoramic image on the grounds of the rotation matrix for motion compensation after smoothing, thereby being able to obtain a 2D panoramic image after image stabilization.

Figure 5:
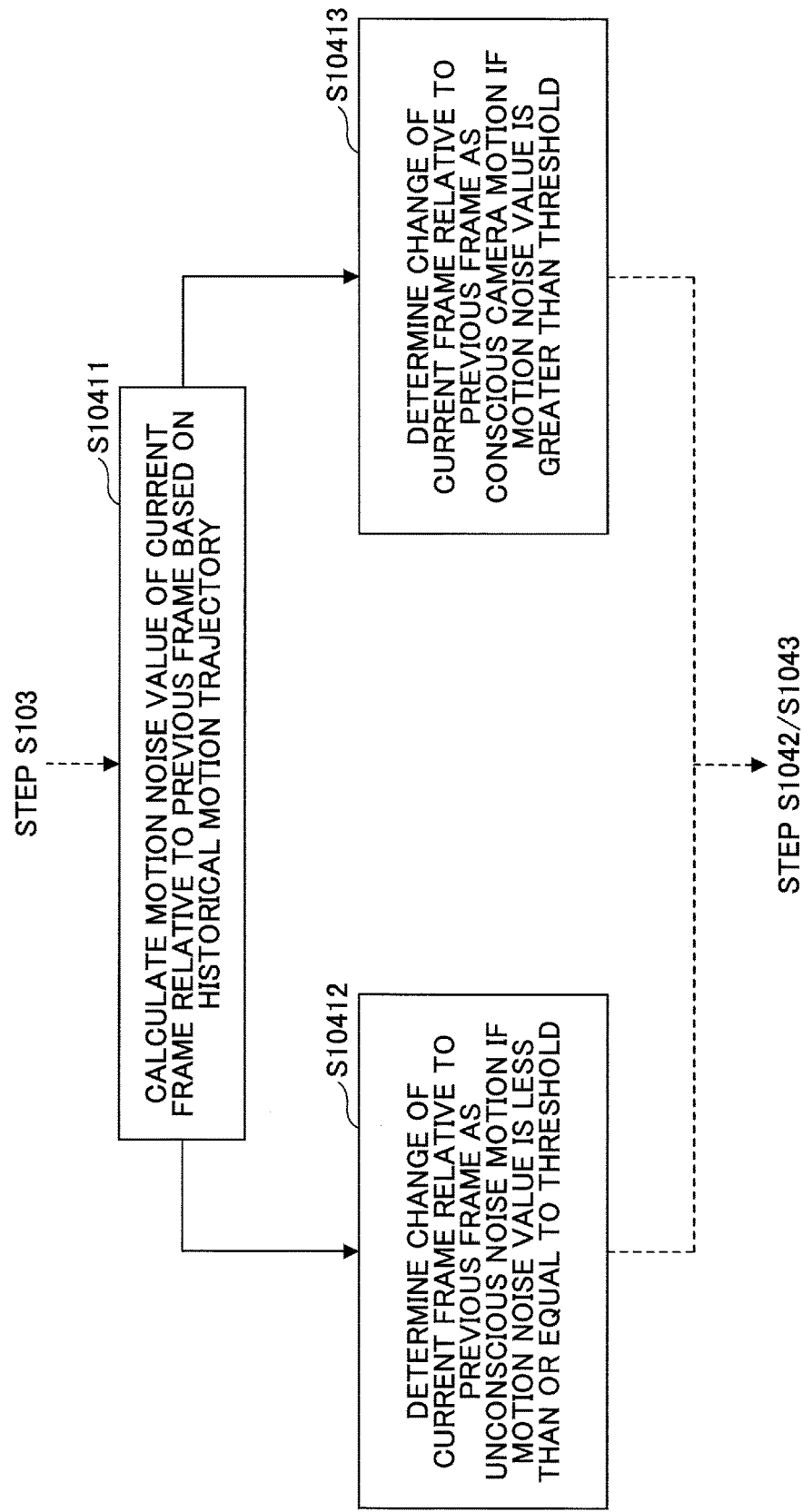
FIG. 5 is a flowchart of an illustration of STEP S1041 in FIG. 4.

As an illustration, STEP S1041 in FIG. 4 may involve STEPS 10411 to S10413, as indicated in FIG. 5 that is a flowchart of STEP S1041 in FIG. 4.

In STEP S10411, on the basis of the historical motion trajectory, a noise value (i.e., a motion noise value) of the current 2D panoramic image relative to the previous 2D panoramic image is computed.

In STEP S10412, if the noise value is less than or equal to a predetermined threshold, then it is determined that the change of the current 2D panoramic image relative to the previous 2D panoramic image is unconscious noise motion. In this case, such unconscious camera motion may be further divided into two types, i.e., unconscious, camera motion within a predetermined noise tolerance range and unconscious camera motion exceeding the predetermined noise tolerance range.

In STEP S10413, if the noise value is greater than the predetermined threshold, then it is determined that the change of the current 2D panoramic image relative to the previous 2D panoramic image is conscious camera motion.

Here it should be noted that for more information about the details of the respective steps in the panoramic video processing method according to this embodiment, it is also possible to see the fifth embodiment below.

<Second Embodiment>

In this embodiment, a panoramic video processing device is provided which may conduct the panoramic video processing methods in accordance with the embodiments of the present disclosure.

Figure 6:
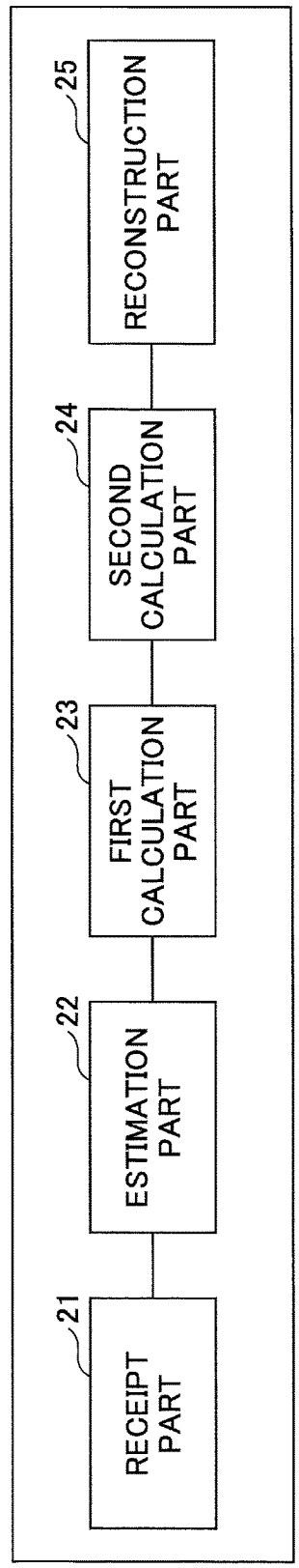
FIG. 6 is a block diagram of a panoramic video processing device according to a second embodiment of the present disclosure.

FIG. 6 is a block diagram of a panoramic video processing device 20 according to this embodiment.

As presented in FIG. 6, the panoramic video processing device 20 may be inclusive of a receipt part 21, an estimation part 22, a first calculation part 23, a second calculation part 24, and a reconstruction part 25.

The receipt part 21 is configured to receive a panoramic video waiting for processing, which contains multiple two dimensional (2D) panoramic images (frames), i.e., implement STEP S101 in FIG. 1, for example.

The estimation part 22 is used to perform inter frame motion estimation on any two adjacent 2D panoramic images (i.e., each two neighboring frames) in the panoramic video so as to acquire an inter frame motion estimation result between the same two adjacent 2D panoramic images, for instance, conducting STEP S102 in FIG. 1.

The first calculation part 23 is utilized to, on the grounds of the respective inter frame motion estimation results, obtain a historical motion trajectory of the panoramic video, and carry out a smoothing process with respect to the historical motion trajectory, i.e., execute STEP S103 in FIG. 1, for example.

The second calculation part 24 is employed to compute a rotation matrix for motion compensation related to each 2D panoramic image in the panoramic video on the basis of the historical motion trajectory after smoothing, for instance, performing STEP S104 in FIG. 1.

The reconstruction part 25 is configured to conduct a reconstruction process with respect to each 2D panoramic image in the panoramic video by using the corresponding rotation matrix for motion compensation so as to attain a panoramic video after video stabilization, and output the panoramic video after video stabilization, i.e., implement STEP S105 in FIG. 1, for example.

Generally speaking, because the spherical panoramic image corresponding to a 2D panoramic image may rotate in any direction without resulting in image information loss, there must be a rotation vector between two 2D panoramic images that renders one of the two 2D panoramic images to approach the other. For this reason, the technical proposal in the present disclosure is computing a rotation matrix for motion compensation pertaining to each 2D panoramic image in a panoramic video, and conducting a reconstruction process in regard to each 2D panoramic image therein by way of the corresponding rotation matrix for motion compensation, so as to achieve video stabilization of the panoramic video.

Figure 7:
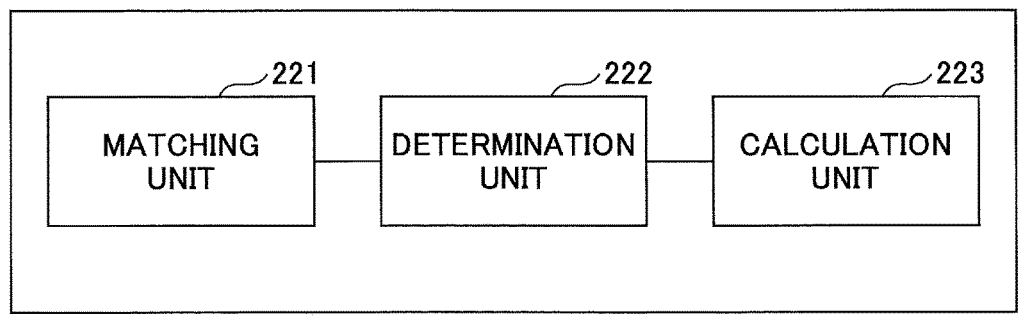
FIG. 7 is a block diagram of an example of the estimation part 22 in FIG. 6.

As an example, the estimation part 22 in FIG. 6 may contain a matching unit 221, a determination unit 222, and a calculation unit 223, as shown in FIG. 7 that is a block diagram of the estimation part 22 in FIG. 6.

The matching unit 221 is configured to conduct a one-to-one matching process in regard to feature points in an N+1-th 2D panoramic image and feature points in the N-th 2D panoramic image (here, N is a positive integer) so as to obtain matching pairs (i.e., matching pairs of feature points), for instance, executing STEP S1021 in FIG. 2.

The determination unit 222 is used to determine correct matching pairs from all the matching pairs between the two neighboring 2D panoramic images, for example, implementing the former part of STEP S1022 in FIG. 2.

The calculation unit 223 is utilized to compute a rotation matrix from the N+1-th 2D panoramic image to the N-th 2D panoramic image on the grounds of the correct matching pairs, i.e., conduct the latter part of STEP 1022 in FIG. 2, for instance.

Figure 8:
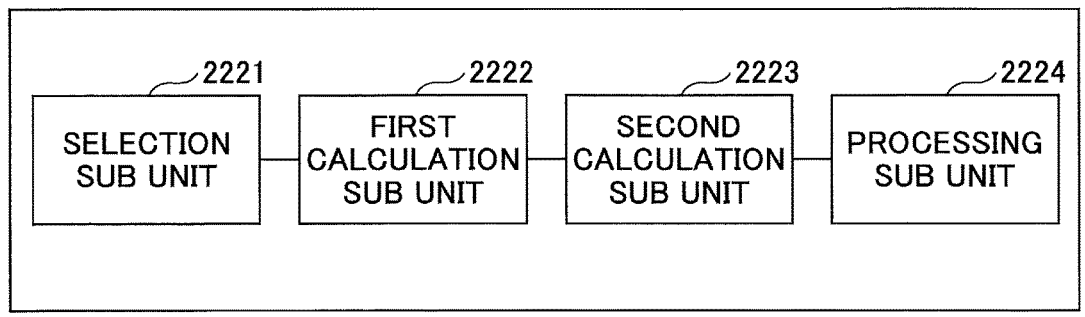
FIG. 8 is a block diagram of an illustration of the determination unit 222 in FIG. 7.

As an illustration, the determination unit 222 in FIG. 7 may include a selection sub unit 2221, a first calculation sub unit 2222, a second calculation sub unit 2223, and a processing sub unit 2224, as indicated in FIG. 8 which is a block diagram of the determination unit 222 in FIG. 7.

The selection sub unit 2221 is configured to select M matching pairs from all the matching pairs between the two 2D adjacent panoramic images (here, M is a positive integer greater than one), i.e., conduct STEP S10221 in FIG. 3, for example.

The first calculation sub unit 2222 is used to, on the basis of the M matching pairs, calculate a first rotation matrix from the N+1-th 2D panoramic image to the N-th 2D panoramic image, for instance, executing STEP S10222 in FIG. 3.

The second calculation sub unit 2223 is utilized to respectively compute errors of the other matching pairs (i.e., the remaining matching pairs) except the M matching pairs in all the matching pairs between the two neighboring 2D panoramic images by way of the first rotation matrix, and determine the number of matching pairs supporting the first rotation matrix according to the respective errors, i.e., implement STEP S10223 in FIG. 3, for example.

The processing sub unit 2224 is employed to, if the number of matching pairs supporting the first rotation matrix is greater than a predetermined threshold, determine that the M matching pairs are correct matching pairs, and if the number of matching pairs supporting the first rotation matrix is less than or equal to the predetermined threshold, determine that the M pairs of points are not correct matching pairs, for example, carrying out STEPS S10224 and S10225, in FIG. 3.

Figure 9:
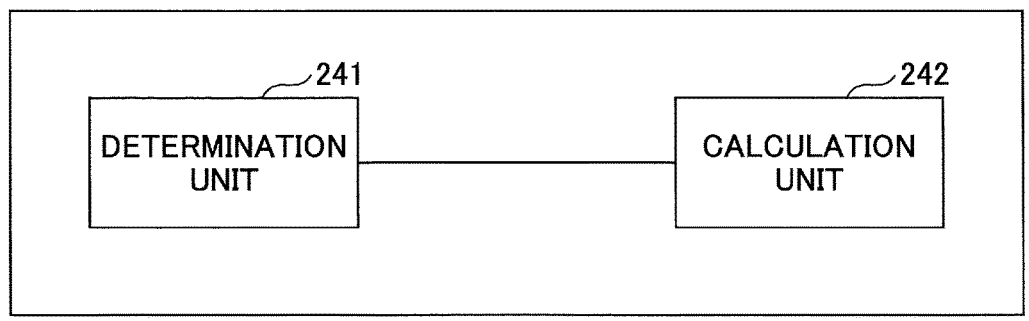
FIG. 9 is block diagram of an example of the second calculation part 24 in FIG. 6.

Moreover, as an example, the second calculation part 24 in FIG. 6 may be inclusive of a determination unit 241 and a calculation unit 242, as presented in FIG. 9 which is block diagram of the second calculation part 24 in FIG. 6.

The determination unit 241 is used to, on the grounds of the historical motion trajectory after smoothing, determine that a change of a current 2D panoramic image (i.e., a current frame) relative to the previous 2D panoramic image (i.e., a previous frame) is unconscious noise motion or conscious camera motion, i.e., conduct STEP S1041 in FIG. 4, for instance.

The calculation unit 242 is utilized to perform, if the change of the current 2D panoramic image relative to the previous 2D panoramic image is unconscious noise motion, calculation on the rotation matrix for motion compensation of the current 2D panoramic image relative to the previous 2D panoramic image, and update, if the change of the current 2D panoramic image relative to the previous 2D panoramic image is conscious camera motion, the related reference 2D panoramic image (also called a "reference frame" for short), and compute a rotation matrix for motion compensation between the current 2D panoramic image and the updated reference 2D panoramic image according to the two, for example, carrying out STEPS S1042 and S1043 in FIG. 4.

After that, the reconstruction part 25 in FIG. 6 carries out a smoothing process in regard to the rotation matrix for motion compensation pertaining to the current 2D panoramic image. And then, motion compensation is carried out with respect to the current 2D panoramic image on the grounds of the rotation matrix for motion compensation after smoothing, so as to obtain a 2D panoramic image after image stabilization.

Figure 10:
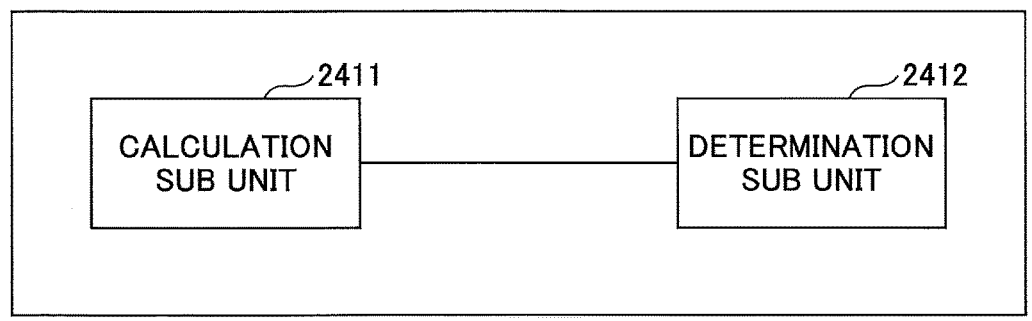
FIG. 10 is a block diagram of an illustration of the determination unit 241 in FIG. 9.

As an illustration, the determination unit 241 in FIG. 9 may contain a calculation sub unit 2411 and a determination sub unit 2412, as shown in FIG. 10 which is a block diagram of the determination 241 in FIG. 9.

The calculation sub unit 2411 is configured to, on the basis of the historical motion trajectory, calculate a motion noise value of the current 2D panoramic image relative to the previous 2D panoramic image, i.e., execute STEP S10411 in FIG. 5, for instance.

The determination sub unit 2412 is employed to determine, if the noise value is less than or equal to a predetermined threshold, that the change of the current 2D panoramic image relative to the previous 2D panoramic image is unconscious noise motion (which may be further divided into two types, i.e., unconscious camera motion within a predetermined noise tolerance range and unconscious camera motion exceeding the predetermined noise tolerance range), and determine, if the noise value is greater than the predetermined threshold, that the change of the current 2D panoramic image relative to the previous 2D panoramic image is conscious camera motion, for example, implementing STEPS S10412 and STEP S10413 in FIG. 5.

<Third Embodiment>

An electronic apparatus is briefly introduced in this embodiment.

Figure 11:
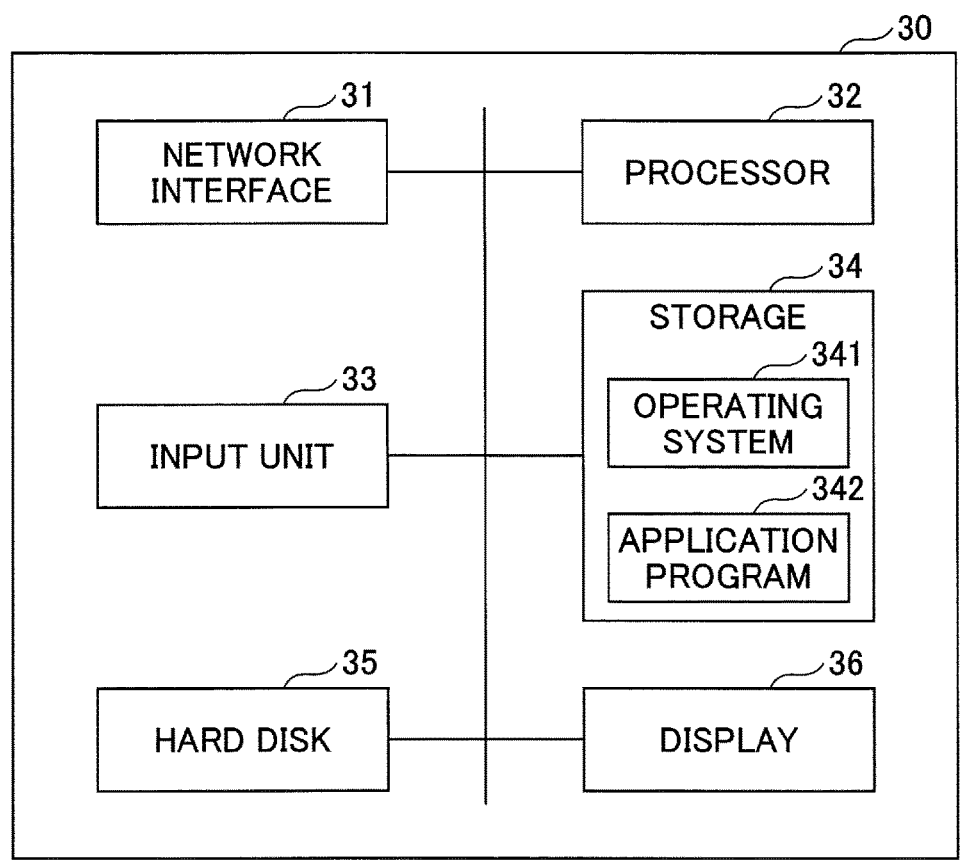
FIG. 11 is a block diagram of an electronic apparatus in accordance with a third embodiment of the present disclosure.

FIG. 11 is a block diagram of an electronic apparatus 30 according to this embodiment.

As presented in FIG. 11, the electronic apparatus 30 may contain a network interface 31, a processor 32, an input unit 33, a storage 34 including an operating system 341 and an application program 342, a hard disk 35, and a display 36 which are connected by a bus.

The network interface 31 may be used to connect to a network such as the Internet, a local area network (LAN), or the like.

The processor 32 may be used to execute a computer program, for example, an application program 342 stored in the storage 34 so as to fulfill the panoramic image processing methods according to the embodiments of the present disclosure.

The input unit 33 may be used to let a user input various instructions, which may be a keyboard or a touch panel, for example.

The storage 34 may be used to store requisite computer programs and data as well as the intermediate results generated when the processor 32 conducts the application program 342, for example. Here it should be noted that the storage 34 may further contain an operating system 341, etc.

The hard disk 35 may be employed to store any information or data necessary to achieve the panoramic image processing methods in accordance with the embodiments of the present disclosure, for instance.

The display 36 may be used to display the results acquired when executing the application program 342 by the processor 32, for instance.

<Fourth Embodiment>

In this embodiment, a computer-executable program and a non-transitory computer-readable medium are briefly described as follows.

The computer-executable program may cause a computer to conduct the panoramic video processing methods in accordance with the embodiments of the present disclosure.

The non-transitory computer-readable medium may store computer-executable instructions (i.e., the computer-executable program) for execution by a computer including a processor(s) or processing system. The computer-executable instructions, when executed, may render the processor(s) or processing system to conduct the panoramic video processing methods according to the embodiments of the present disclosure.

<Fifth Embodiment>

With the development of camera related techniques, 360-degree panoramic cameras have been widely applied in people's lives. A well-known panoramic camera may capture a panoramic image by way of two fisheye lenses, for instance.

Figure 12:
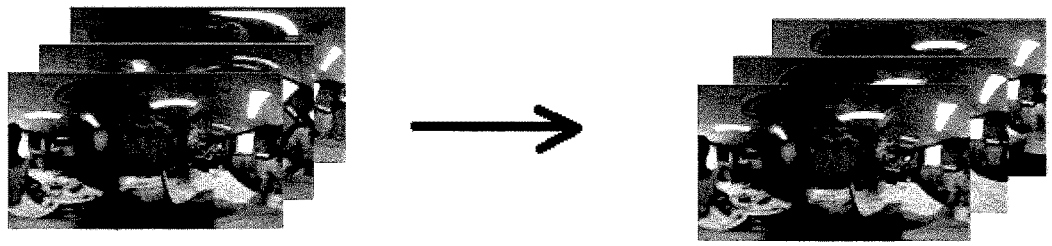
FIG. 12 illustrates an example of a panoramic image sequence before and after video stabilization.

FIG. 12 illustrates an example of a panoramic image sequence (i.e., a panoramic video) before and after video stabilization.

As described above, in a spherical coordinate system, the spherical panoramic image corresponding to a two dimensional (2D) panoramic image may rotate along any direction without rendering image information loss, so there must be a rotation vector between two 2D panoramic images which lets one of the two 2D panoramic images approach the other. In other words, estimating the rotation vector (i.e., a rotation matrix) is the key to panoramic video stabilization. Hence, the technical proposal in the present disclosure mainly focuses on accurately performing estimation on the rotation matrix and conducting a smoothing process in regard to the rotation matrix.

In this embodiment, another panoramic video processing method is provided which is in light of the panoramic video processing method in accordance with the first embodiment.

Figure 13:
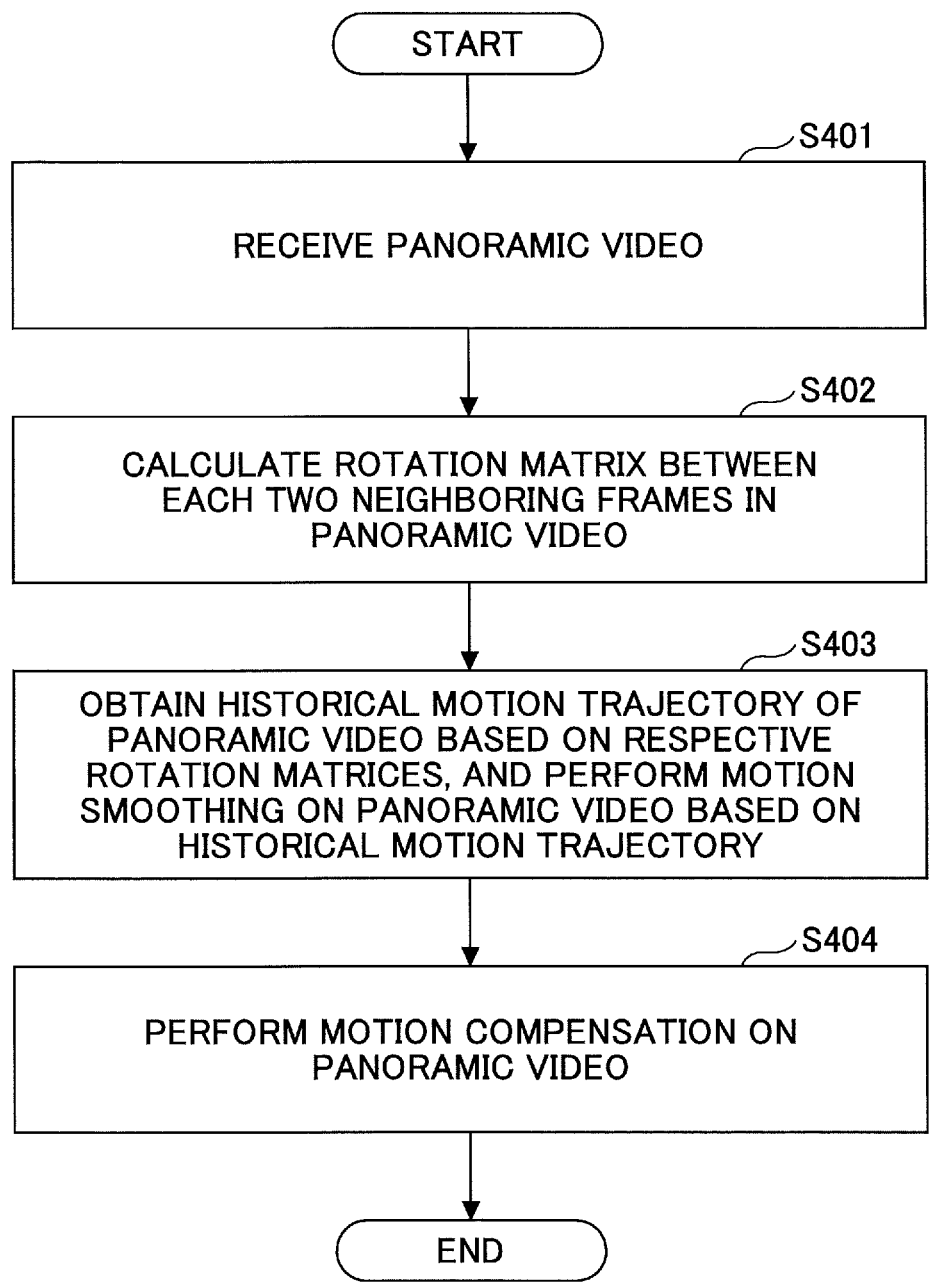
FIG. 13 is a flowchart of another panoramic video processing method according to a fifth embodiment of the present disclosure.

FIG. 13 is a flowchart of the other panoramic video processing method according to this embodiment.

As presented in FIG. 13, the other panoramic video processing method is inclusive of STEPS S401 to S404.

In STEP S401 of FIG. 13, a panoramic video (i.e., a panoramic image sequence) is received.

The panoramic video may be an on-line panoramic video captured by a panoramic camera, or may also be an off-line panoramic video stored in advance. The input panoramic video contains a plurality of 2D panoramic images (frames).

In STEP S402 of FIG. 13, a rotation matrix between any two adjacent 2D panoramic images (i.e., each two neighboring frames) in the panoramic video is calculated.

Here each 2D panoramic image in the panoramic video may be an equirectangular projection. As an illustration, it is possible to adopt a conventional corner feature based approach such as a Harris corner feature based approach, a FAST (Features from Accelerated Segment Test) corner feature based approach, a SURF (Speeded Up Robust Features) corner feature based approach, a SIFT (Scale Invariant Feature Transform) corner feature based approach, or the like to carry out feature point matching.

Figure 14:
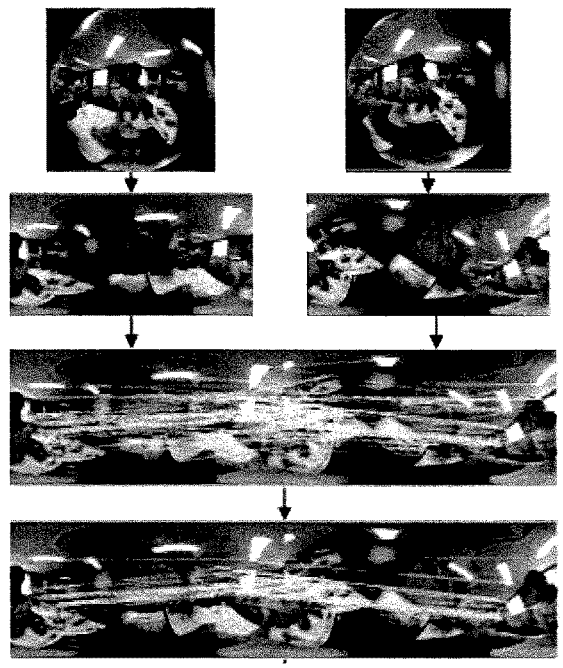
FIG. 14 illustrates an example of feature point matching.

FIG. 14 illustrates an example of feature point matching.

As shown in FIG. 14, feature point matching is conducted in regard to two adjacent 2D panoramic images by means of a conventional corner feature based approach so as to acquire matching pairs (i.e., matching pairs of feature points) which are indicated by white line segments in this drawing, and then, correct matching pairs are determined.

It can be understood from the matching results in FIG. 14 that there may exist many erroneous matching pairs. Consequently, there is a need to remove the erroneous matching pairs. In a conventional 2D image feature point matching process, a 2D affine transformation model is usually used to perform matching pair selection. However, because of the particularity of 2D panoramic images, they cannot meet the 2D affine transformation model in a 2D space. That is, if the 2D affine transformation model is applied to selecting matching pairs between two 2D panoramic images, then some correct matching pairs may be deleted, and at the same time, some incorrect matching pairs may be retained. This may negatively affect the accuracy of results of motion estimation. As such, in light of the particularity of 2D panoramic images, a matching pair selection approach based on a unit sphere is proposed in the present disclosure, namely, carrying out matching pair selection on the grounds of the consistency of rotational motion in a spherical space.

In particular, removing mistaken matching pairs so as to retain correct matching pairs involves the following steps (1) to (6).

(1) Matching pairs in a 2D space are converted into a unit sphere coordinate system. In the unit sphere coordinate system, the motion directions of all the matching pairs between two neighboring 2D panoramic images may keep consistent.

(2) M matching pairs are randomly selected from all the matching pairs. Here it is possible to randomly choose four matching pairs for calculating a rotation matrix, for example.

(3) A rotation matrix between the two neighboring 2D panoramic images is calculated on the basis of the M matching pairs;

(4) An error function pertaining to the remaining matching pairs (i.e., those except the M matching pairs in all the matching pairs) is procured on the grounds of the rotation matrix, and the remaining matching pairs are input into the rotation matrix, so as to attain errors respectively satisfying the rotation matrix.

(5) Matching pairs supporting the rotation matrix are chosen. Particularly, if the error attained of a matching pair is less than a predetermined value (threshold), then the matching pair may be deemed as supporting the rotation matrix. In this way, it is possible to obtain all the matching pairs supporting the rotation matrix.

(6) It is judged whether the rotation matrix meets a predetermined requirement. That is, if the number of all the matching pair supporting the rotation matrix is greater than a predetermined threshold, then it may be regarded that the M matching pairs are correct matching pairs; otherwise, the steps (2) to (5) are repeatedly carried out until correct matching pairs are found.

As shown in the image at the bottom in FIG. 14, compared to the initial matching results (as indicated in the second image from the bottom), some erroneous matching pairs are removed.

After that, a rotation matrix is calculated on the basis of the correct matching pairs. By using the correct matching pairs, it is possible to compute a more accurate rotation matrix.

In a three dimensional (3D) space, the main motion of a camera may be divided into rotational motion and translational motion. Thus, the shaking of a 2D panoramic image includes not only the shaking caused by the rotational motion of the relevant camera but also the shaking made by the translational motion of the relevant camera. However, due to the particularity of 2D panoramic images, translational motion may be approximated as a kind of rotational motion. For this reason, the shaking of a camera is described mainly by way of rotational motion in the present disclosure. Well-used rotational motion calculation algorithms include rotation matrix, Euler angle, and rotation vector based algorithms, for example. Here a rotation matrix serves as the description of rotational motion.

Referring again to FIG. 13; in STEP S403, a historical motion trajectory of the panoramic video is procured on the grounds of the rotation matrix between any two adjacent 2D panoramic images in the panoramic video, and a smoothing process is conducted in regard to the panoramic video on the basis of the historical motion trajectory.

It is possible to gain the historical motion trajectory of the panoramic video in accordance with the rotation matrix between each two adjacent 2D panoramic images in the panoramic video. The smoothing process aims to remove the random shaking caused by the random shaking of a camera so as to retain the real motion of the camera. Here it should be noted that only the conscious motion of a camera is deemed as the real motion of the camera; that is, any other motion of the camera are regarded as noise motion.

In this embodiment, a rotation matrix is adopted to conduct rotational motion description, and Euler angles are utilized to perform rotational motion trajectory description. Because of the instability of a hand-held camera when it captures images, the images captured are also not stable. The shaking in these types of images rendered by the instability of the hand-held camera is a kind of noise motion. As such, on-line motion smoothing is conducted by eliminating this kind of noise motion, which is inclusive of the following steps (A) to (C).

(A) It is determined that motion causing a change in a current 2D panoramic image (i.e., a current frame) is unconscious noise motion or conscious camera motion (e.g., motion occurring when a user intentionally adjusts the pose of his/her hand-held camera).

Particularly, it is possible to determine based on the historical motion trajectory whether the motion causing a change in the current 2D panoramic image is unconscious noise motion or conscious camera motion. If the variation of a parameter pertaining to the relative motion of the current 2D panoramic image with respect to the previous 2D panoramic image (i.e., a previous frame) exceeds a predetermined threshold, then this kind of motion may be regarded as conscious camera motion, and if the variation is less than the predetermined threshold, then this kind of motion may be deemed as unconscious shaking, i.e., unconscious noise motion. If the motion causing a change in the current 2D panoramic image is unconscious noise motion, then image stabilization is performed on the current 2D panoramic image by way of de-noising, and if the motion is conscious camera motion, then update is directly carried out in regard to the relevant reference 2D panoramic image (also called a "reference frame" for short).

It is possible to utilize the following equations (1) to (3) to describe the related determination process, for example.

$$\text{angle\_error} = \text{abs}(\text{angle}_{inter\_frame} - \text{mean}(\text{angle}_{(n-size)}^{noise}, \text{angle}_{(n-size+1)}^{noise}, \ldots, \text{angle}_{(n-1)}^{noise})) \quad (1)$$

$$\text{angle}_n^{smooth} = \begin{cases} \text{angle}_{n-1}^{smooth} & \text{angle\_error} \leq T1 \\ \text{angle}_n^{actual} & T1 < \text{angle\_error} \leq T2 \\ \text{updatedParameter} & \text{other case} \end{cases} \quad (2)$$

$$\text{angle}_n^{actual} = \text{angle}_n - \text{mean}(\text{angle}_{(n-size)}^{noise}, \text{angle}_{(n-size+1)}^{noise}, \ldots, \text{angle}_{(n-1)}^{noise}) \quad (3)$$

In the equations (1) to (3), angle_error is the motion noise of a camera; $\text{angle}_{inter\_frame}$ denotes the angle of motion between two adjacent 2D panoramic images; mean $(\text{angle}_{(n-size)}^{noise}, \text{angle}_{(n-size+1)}^{noise}, \ldots, \text{angle}_{(n-1)}^{noise})$ refers to the average of motion noise within a predetermined sliding window; $\text{angle}_n^{smooth}$ is an angle of motion after smoothing; $\text{angle}_n^{actual}$ means an angle by which smoothing is performed on a current 2D panoramic image; updatedParameter stands for the parameter(s) of the updated reference frame; and $\text{angle}_{rs}$ represents the actual angle of motion of the camera relative to the relevant reference frame. Here, $\text{angle}^{noise}$ refers to the difference of motion between two neighboring 2D panoramic images after image stabilization, and n is indicative of the number of 2D panoramic images (frames).

Moreover, T1 and T2 in the equation (2) are predetermined thresholds. If the value of angle_error in the equation (2) is less than or equal to T2 (i.e., angle_error≤T2), then that means the relevant camera motion is unconscious camera motion. The value of T2 can be acquired by experiments in advance, which may be 10 in this embodiment, for instance. In this case, this kind of unconscious camera motion may be further divided into two types, i.e., unconscious camera motion within a predetermined noise tolerance range and unconscious camera motion exceeding the predetermined noise tolerance range. The unconscious camera motion within the predetermined noise tolerance range corresponds to the case of angle_error≤T1 in the equation (2), and unconscious camera motion exceeding the predetermined noise tolerance range corresponds to the case of T1<angle_error≤T2 in the equation (2).

According to experiments, if the Euler angles pertaining to motion between two neighboring 2D panoramic images are within a range of [0,1], shaking cannot be observed by users. Thus, in the equation (2), T1=1.

Consequently, in the equation (2), when angle_error≤T1, the motion smoothing process pertaining to the current 2D panoramic image is the same as the motion smoothing process relating to the previous 2D panoramic image; when T1<angle_error≤T2, an angle by which a smoothing process needs to be performed on the current 2D panoramic image is equal to $\text{angle}_n^{actual}$ which may be computed by means of the equation (3); and when T2<angle_error (i.e., in the other case), it is deemed that the current 2D panoramic image is dramatically different from the relevant reference frame, so it is necessary to update the relevant reference frame.

(B) A smoothing process is conducted in regard to noise motion including noise, namely, carrying out a de-noising process with respect to the related Euler angles pitch, roll, and yaw, as expressed by the following formula (4).

$$\text{roll}_n^{smooth} = \text{roll}_n - \text{mean}(\text{roll}_{(n-size)}^{noise}, \text{roll}_{(n-size+1)}^{noise}, \ldots, \text{roll}_{(n-1)}^{noise})$$

$$\text{yaw}_n^{smooth} = \text{yaw}_n - \text{mean}(\text{yaw}_{(n-size)}^{noise}, \text{yaw}_{(n-size+1)}^{noise}, \ldots, \text{yaw}_{(n-1)}^{noise})$$

$$\text{pitch}_n^{smooth} = \text{pitch}_n - \text{mean}(\text{pitch}_{(n-size)}^{noise}, \text{pitch}_{(n-size+1)}^{noise}, \ldots, \text{pitch}_{(n-1)}^{noise}) \quad (4)$$

(C) A rotation matrix for motion compensation is calculated on the basis of the Euler angles after smoothing.

A rotation angle error is computed on the grounds of the current smooth frame and the previous smooth frame, which may be used to evaluate the result of image stabilization. As is well known, in an image stabilization process, it is impossible to obtain an absolutely stabilized result; that is, there still exists the negative influence due to noise motion. For this reason, the rotation angle noise between two smoothed frames is calculated for carrying out evaluation in regard to image stabilization of the follow-on frame. In addition, a sliding window is adopted for saving inter frame motion noise, whose size may be set according to a frame rate.

If it is determined based on the equation (2) that there is a sudden change in the current 2D panoramic image, then an update process is performed on the relevant reference 2D panoramic image so as to avoid an additional accumulative error.

Referring to FIG. 13 again; in STEP S404, motion compensation is carried out with respect to the panoramic video.

Motion compensation refers to conducting reconstruction in regard to the panoramic video on the basis of the result of motion smoothing, i.e., the rotation matrix for motion compensation. In a conventional 2D video stabilization process, generally image reconstruction is carried out based on image cropping so as to accomplish image stabilization. However, image cropping may destroy the 360-degree wide angle feature of a 2D panoramic image. The 2D panoramic image is a spherical image in a 3D space. Due to the characteristics of spherical images, a spherical image may rotate in any direction without wrecking its characteristics so as to achieve the effect of image stabilization. As such, motion compensation with respect to an unstable spherical image is mainly represented as rotational motion compensation; that is, there is no need to carry out image cropping.

Figure 15:
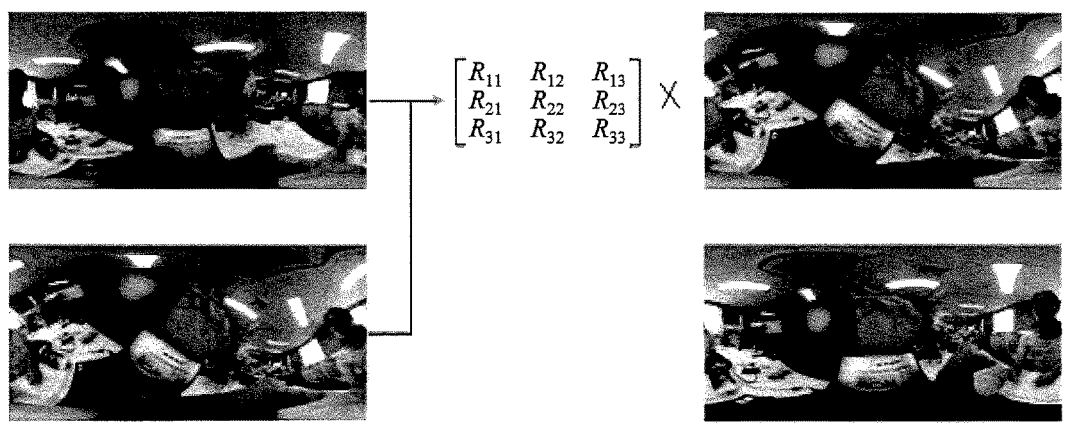
FIG. 15 illustrates an example of conducting motion compensation in regard to an unstable two dimensional (2D) panoramic image.

FIG. 15 illustrates an example of conducting motion compensation in regard to an unstable 2D panoramic image.

As shown in FIG. 15, the image at the top left is a reference 2D panoramic image, and the image at the bottom left is an unstable 2D panoramic image waiting for motion compensation (i.e., a current 2D panoramic image). On the basis of the reference 2D panoramic image and the current 2D panoramic image, it is possible to calculate a rotation matrix for motion compensation between the two. And then, by way of on-line motion smoothing, a rotation matrix after smoothing may be acquired which is also indicated in this drawing. After that, the rotation matrix after smoothing is applied to the image at the top right which is the same as the image at the bottom left, thereby being able to achieve motion compensation. In this way, it is possible to obtain a stabilized 2D panoramic image which is located at the bottom right. By comparing the reference 2D panoramic image and the stabilized 2D panoramic image, it is clear that the stabilized 2D panoramic image is more stable. The rotation matrix for motion compensation may be calculated as follows.

$$R = \begin{bmatrix} 1 & 0 & 0 \\ 0 & \cos(\theta_x) & -\sin(\theta_x) \\ 0 & \sin(\theta_x) & \cos(\theta_x) \end{bmatrix} * \begin{bmatrix} \cos(\theta_y) & 0 & \sin(\theta_x) \\ 0 & 1 & 0 \\ -\sin(\theta_y) & 0 & \cos(\theta_y) \end{bmatrix} * \begin{bmatrix} \cos(\theta_z) & -\sin(\theta_z) & 0 \\ \sin(\theta_z) & \cos(\theta_z) & 0 \\ 0 & 0 & 1 \end{bmatrix} \quad (5)$$

Here, R is a rotation matrix; and $\theta_x$, $\theta_y$, and $\theta_z$ are Euler angles roll, pitch, and yaw calculated according to global motion, which stand for the rotation angles of a current frame relative to a reference frame.

In addition, the stabilized 2D panoramic image may be computed as follows.

$$\text{stablizedImage} = R_{smooth} * R_{noise} * \text{unstableImage} + T \quad (6)$$

Here, $R_{smooth}$ denotes a rotation matrix after smoothing, $R_{noise}$ indicates an original rotation matrix, and T refers to a motion offset. Since the motion of a spherical image is mainly represented as rotational motion in a spherical image stabilization process, T may be omitted in general.

Finally, the stabilized panoramic video may be output. Here it should be noted that if the input panoramic video is an on-line panoramic video, then the output panoramic video is also an on-line panoramic video, and if the input panoramic video is an off-line panoramic video, then the output panoramic video is also an off-line panoramic video.

Therefore, it is obvious from the above that due to the characteristics of spherical panoramic images, the motion of an unstable spherical panoramic image is mainly expressed as rotational motion, so a panoramic image stabilization approach based on rotational motion compensation is proposed in the present disclosure. By utilizing this type of approach, it is possible to fulfill video stabilization according to the rotation of a spherical panoramic image in any direction without using a conventional image cropping process. In addition, Euler angles are used particularly when carrying out on-line motion smoothing (i.e., there is no need to employ a complicated 3D motion model), so it is also possible conduct an on-line image stabilization process.

Compared to the conventional techniques, the technical proposal in the present disclosure first determines that the motion in a current frame is conscious motion or unconscious motion. If the motion in the current frame is conscious motion, then the relevant reference frame is updated directly. If the motion in the current frame is unconscious motion, then it is necessary to make a further determination. That is, if the unconscious motion is within a predetermined noise tolerance range, then the parameters of motion smoothing pertaining to the previous frame is applied to motion smoothing with respect to the current frame; otherwise, there is a need to introduce the noise motion of the current frame, and perform motion smoothing on the grounds of the corresponding historical motion information. In this way, it is possible to reduce the relevant accumulated error.

Here it should be noted that the embodiments of the present disclosure may be implemented in any convenient form, for example, using dedicated hardware or a mixture of dedicated hardware and software. The embodiments of the present disclosure may be implemented as computer software executed by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present disclosure can be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 201710432784.9 filed on Jun. 9, 2017, the entire contents of which are hereby incorporated by reference.

What is claimed is:

1. A panoramic video processing method comprising:
    receiving a panoramic video to be processed, the panoramic video including a plurality of two dimensional (2D) panoramic images;
    conducting inter frame motion estimation with respect to each two neighboring 2D panoramic images in the panoramic video so as to obtain a corresponding inter frame motion estimation result between the same two neighboring 2D panoramic images;
    calculating, based on the respective inter frame motion estimation results obtained between the plurality of 2D panoramic images, a historical motion trajectory of the panoramic video, and carrying out smoothing with respect to the historical motion trajectory;
    calculating, based on the historical motion trajectory after smoothing, a rotation matrix for motion compensation pertaining to each 2D panoramic image in the panoramic video, the calculating including processes of
        setting a first 2D panoramic image in the plurality of 2D panoramic images as a first reference 2D panoramic image; and
        determining, based on the historical motion trajectory after smoothing, whether a change in a current 2D panoramic image relative to a previous 2D panoramic image is due to unconscious noise motion or conscious camera motion, wherein
            in a case where the change is determined as unconscious noise motion, the rotation matrix for motion compensation of the current 2D panoramic image, relative to the previous 2D panoramic image, is calculated, and
            in a case where the change is determined as conscious camera motion, the first reference 2D panoramic image is replaced with a second reference 2D panoramic image from a later time than the first 2D panoramic image, and the rotation matrix for motion compensation is then recalculated based on the second reference 2D panoramic image and the current 2D panoramic image; and
    performing reconstruction on each 2D panoramic image in the panoramic video by way of the corresponding rotation matrix for motion compensation so as to attain a panoramic video after image stabilization, and
    outputting the panoramic video after image stabilization.

2. The panoramic video processing method according to claim 1, wherein, the conducting inter frame motion estimation with respect to each two neighboring 2D panoramic images in the panoramic video so as to obtain an inter frame motion estimation result between the same two neighboring 2D panoramic images includes
    carrying out a matching process with respect to feature points in an N+1-th 2D panoramic image and feature points in an N-th 2D panoramic image so as to gain matching pairs, N being a positive integer; and
    determining correct matching pairs from all the matching pairs, and computing, based on the correct matching pairs, a rotation matrix from the N+1-th 2D panoramic image to the N-th panoramic image.

3. The panoramic video processing method according to claim 2, wherein, the determining correct matching pairs from all the matching pairs includes
    selecting M matching pairs from all the matching pairs, M being a positive integer greater than one;
    calculating, based on the M matching pairs, a first rotation matrix from the N+1-th 2D panoramic image to the N-th 2D panoramic image;
    computing, by way of the first rotation matrix, errors of other matching pairs except the M matching pairs in all the matching pairs, and determining, based on the respective errors computed, a number of matching pairs supporting the first rotation matrix; and
    determining, if the number of matching pairs supporting the first rotation matrix is greater than a predetermined threshold, that the M matching pairs are correct matching pairs, otherwise, that the M matching pairs are not correct matching pairs.

4. The panoramic video processing method according to claim 1, wherein, the determining, based on the historical motion trajectory after smoothing, that a change of a current 2D panoramic image relative to a previous 2D panoramic image is unconscious noise motion or conscious camera motion includes
    calculating, based on the historical motion trajectory, a motion noise value of the current 2D panoramic image relative to the previous 2D panoramic image; and
    determining, if the motion noise value is less than or equal to a predetermined threshold, that the change is unconscious noise motion including unconscious noise motion within a predetermined noise tolerance range and unconscious noise motion exceeding the predetermined noise tolerance range, and if the motion noise value is greater than the predetermined threshold, that the change is conscious camera motion, the predetermined noise tolerance range being less than or equal to another threshold which is less than the predetermined threshold.

5. A panoramic video processing device comprising:
    a processor; and
    a memory storing program instructions that cause the processor to:
        receive a panoramic video to be processed, the panoramic video including a plurality of two dimensional (2D) panoramic images;

conduct inter frame motion estimation in regard to each two neighboring 2D panoramic images in the panoramic video so as to obtain a corresponding inter frame motion estimation result between the same two neighboring 2D panoramic images;

calculate, based on the respective inter frame motion estimation results obtained between the plurality of 2D panoramic images, a historical motion trajectory of the panoramic video, and carrying out smoothing with respect to the historical motion trajectory;

calculate, based on the historical motion trajectory after smoothing, a rotation matrix for motion compensation pertaining to each 2D panoramic image in the panoramic video, the calculating including processes of setting a first 2D panoramic image in the plurality of 2D panoramic images as a first reference 2D panoramic image; and determining, based on the historical motion trajectory after smoothing, whether a change in a current 2D panoramic image relative to a previous 2D panoramic image is due to unconscious noise motion or conscious camera motion, wherein in a case where the change is determined as unconscious noise motion, the rotation matrix for motion compensation of the current 2D panoramic image, relative to the previous 2D panoramic image, is calculated, and in a case where the change is determined as conscious camera motion, the first reference 2D panoramic image is replaced with a second reference 2D panoramic image from a later time than the first 2D panoramic image, and the rotation matrix for motion compensation is then recalculated based on the second reference 2D panoramic image and the current 2D panoramic image; and reconstruct on each 2D panoramic image in the panoramic video by way of the corresponding rotation matrix for motion compensation so as to attain a panoramic video after image stabilization, and to output the panoramic video after image stabilization.

6. A non-transitory computer-readable medium having computer-executable instructions for execution by a processing system, wherein, the computer-executable instructions, when executed, cause the processing system to carry out the panoramic video processing method according to claim 1.

* * * * *